(12) United States Patent
Jay (10) Patent No.: US 10,492,590 B2
(45) Date of Patent: Dec. 3, 2019

(54) MIRROR ASSEMBLY AND STRAP

(71) Applicant: Mark Robert Jay, Hove East Sussex (GB)

(72) Inventor: Mark Robert Jay, Hove East Sussex (GB)

( * ) Notice: Subject to any disclaimer, the term of this patent is extended or adjusted under 35 U.S.C. 154(b) by 10 days.

(21) Appl. No.: 15/520,440

(22) PCT Filed: Sep. 25, 2015

(86) PCT No.: PCT/GB2015/052781
§ 371 (c)(1),
(2) Date: Apr. 20, 2017

(87) PCT Pub. No.: WO2016/063003
PCT Pub. Date: Apr. 28, 2016

(65) Prior Publication Data
US 2017/0303666 A1    Oct. 26, 2017

(30) Foreign Application Priority Data

Oct. 23, 2014    (GB) .................................. 1418887.4

(51) Int. Cl.
| | |
|---|---|
| *A45D 42/06* | (2006.01) |
| *G02B 7/182* | (2006.01) |
| *B62J 29/00* | (2006.01) |
| *A45C 13/30* | (2006.01) |
| *A44C 5/00* | (2006.01) |

(52) U.S. Cl.
CPC .............. *A45D 42/06* (2013.01); *A45C 13/30* (2013.01); *B62J 29/00* (2013.01); *G02B 7/182* (2013.01); *G02B 7/1827* (2013.01); *A44C 5/0007* (2013.01); *A45C 2013/303* (2013.01)

(58) Field of Classification Search
CPC ............ G02B 7/182; A45D 42/06; B62J 29/00
USPC ........................................................ 359/879
See application file for complete search history.

(56) References Cited

U.S. PATENT DOCUMENTS

| | | | | |
|---|---|---|---|---|
| 574,877 | A | * | 1/1897 | Blomiley |
| 664,365 | A | * | 12/1900 | Williamson |
| 1,594,147 | A | * | 7/1926 | Barrows ................. A45D 42/20 132/296 |
| 1,709,182 | A | * | 4/1929 | McKnight ............ A45D 33/006 132/301 |

(Continued)

FOREIGN PATENT DOCUMENTS

| | | |
|---|---|---|
| CN | 201685924 U | 12/2010 |
| WO | 2014/121499 A1 | 8/2014 |

OTHER PUBLICATIONS

International Search Report and Written Opinion dated Feb. 17, 2016 in corresponding PCT application No. PCT/GB2015/052781.

*Primary Examiner* — Ricky D Shafer
(74) *Attorney, Agent, or Firm* — Nields, Lemack & Frame, LLC (57) ABSTRACT

The present invention relates to a mirror assembly for use by an individual, the mirror assembly comprising:—a base unit (4) having a user fastening (6) for releasably fastening the base unit to a user; and a mirror unit (1) connected to the base unit by an arm member (2,3), the arm member being deployable to move the mirror unit away from the base unit, wherein the arm member is formed of first and second limbs, hingedly coupled together. The present invention further concerns a strap for use with such an assembly.

17 Claims, 7 Drawing Sheets

(56) References Cited

U.S. PATENT DOCUMENTS

| | | | | |
|---|---|---|---|---|
| 1,982,248 A | * | 11/1934 | Gebhardt | A44C 5/003 |
| | | | | 132/296 |
| 2,465,946 A | * | 3/1949 | Velez | A45D 33/26 |
| | | | | 132/315 |
| 3,381,120 A | * | 4/1968 | Stern | A45C 5/005 |
| | | | | 312/227 |
| 4,054,375 A | | 10/1977 | Ribeca | |
| 4,684,017 A | * | 8/1987 | Watanabe | A45D 33/22 |
| | | | | 16/265 |
| 4,840,288 A | * | 6/1989 | Lunderman | A45C 11/24 |
| | | | | 206/235 |
| 7,063,427 B1 | | 6/2006 | Cutler | |
| 2014/0300981 A1 | * | 10/2014 | Crane | A45D 42/06 |
| | | | | 359/879 |

\* cited by examiner

MIRROR ASSEMBLY AND STRAP

The present invention relates to a mirror assembly and strap, and particularly to such an assembly and strap for use by individuals involved in sporting recreational activities such as cycling.

In this connection, several products are available today which attempt to provide individuals such as cyclists with rear vision. More particularly many of these products take the form of mirror that is attached to the bicycle handlebars, its frame or to a rider's helmet. However, these products are not in widespread use as they are impractical to use and/or are readily damaged or stolen. Often they are difficult to remove from their fixing and when removed are not conveniently dimensioned or profiled for temporary storage, for example in a pocket.

More recently some wrist mounted devices have been made available which are aimed at cyclists using racing bikes. These devices are however of limited use and generally only suitable for bicycles with drop handle bars and are unsuitable for the vast majority of cyclists who use straight handle bars. It is noted that today approximately 85% of bicycles have straight handle bars. Furthermore, there is known a wristband arrangement where a mirror is mounted on a telescopic rod, such as in CN201685924. However, this arrangement is clumsy and difficult to stow away and unsuitable to be readily carried when removed from the user.

The present invention is directed to overcoming such problems associated with known arrangements.

According to a first aspect of the invention, there is provided a mirror assembly for use by an individual, the mirror assembly comprising: a base unit having a user fastening for releasably fastening the base unit to a user; and a mirror unit connected to the base unit by an arm member, the arm member being deployable to move the mirror unit away from the base unit, wherein the arm member is formed of first and second limbs, hingedly coupled together.

In this way, the mirror assembly can be worn, for example, on a cyclist's wrist or arm to offer the cyclist a clear rear view. In particular, the deployable feature of the arm allows the mirror unit to be moved away from the cyclist's body so that the cyclist's rear view is not occluded. Accordingly, the present invention provides a mirror assembly suitable for sporting activities, such as cycling, including where the bicycles have straight handle bars.

Preferably, the first limb is retractable into the base unit, and conveniently the second limb is retractable into the mirror unit. In this manner, the arm member can be safely stowed away when the mirror assembly is not in use.

The base unit is preferably rotatably mounted with respect to the user fastening thereby affording a first degree of motion.

Preferably, the mirror unit is rotatable about the axes of the first and/or second limb, thereby affording a further degree of motion.

Conveniently, the first and second limbs are slideably receivable into respective cavities of the base unit and the mirror unit. This provides a suitable means for stowing and deploying the arm member.

The first limb may be rotatably mounted with respect to the base unit, thereby providing a further degree of motion.

Preferably, the second limb is profiled to resist rotation with respect to the mirror unit. As such, when the first limb is rotated, the second limb and mirror unit will be correspondingly rotated.

Conveniently, the mirror unit houses a flat or a spherical mirror.

The base unit and the mirror unit have matching exterior profiles, and the mirror assembly can be deployable between open and closed states, whereby in the open state, the first and/or second limbs extend out of their respective cavities, and in the closed state the first and second limbs are retracted within their respective cavities and the second limb is rotated about its hinge with the first limb so that the mirror unit folds onto the base unit.

Preferably, the base unit has a circular shape and the mirror unit has a circular shape, and wherein the respective centres of the base unit and the mirror unit can align when the mirror unit folds onto the base unit.

Conveniently, the second limb has an angled section adjacent the hinge to allow a lower face of the mirror unit to seat against an upper face of the base unit. In this way, the mirror assembly can be closed to form a compact unit that can be readily stowed and carried by a user.

Whilst the user fastening may take any suitable form it preferably comprises a strap.

Preferably, the strap comprises a central area having first and second arms extending therefrom; a top surface of the strap having a section of first fastening material extending along said first arm substantially from the central area to its end, the first arm being provided with a free loop; an underside surface having a section of second fastening material extending along said first arm, the second fastening material being configured for releasably mating with the first fastening material; the underside surface further being provided with a section of said first fastening material extending across said central area and along said second arm, and a section of second fastening material at an end portion of the second arm.

According to a further aspect of the present invention there is provided a strap comprising: a central area having first and second arms extending therefrom; a top surface of the strap having a section of first fastening material extending along said first arm substantially from the central area to its end, the first arm being provided with a free loop; an underside surface having a section of second fastening material extending along said first arm, the second fastening material being configured for releasably mating with the first fastening material; the underside surface further being provided with a section of said first fastening material extending across said central area and along said second arm, and a section of second fastening material at an end portion of the second arm.

Conveniently, the central area comprises an enlarged cushioned area. This provides comfort to the user.

Preferably, the free loop is free to move along the first arm. In this manner, the strap can be readily adjusted to fit different users.

The first and second fastening materials may be of a hook and loop variety. Conveniently, the strap is substantially planar.

Embodiments of the invention are described below with reference to the appended figures. It is to be understood that these figures depict examples of the invention and are not in any way meant to limit the scope thereof. Therefore, the invention will be described in detail with reference to the accompanying figures in which.

Figure 1A:
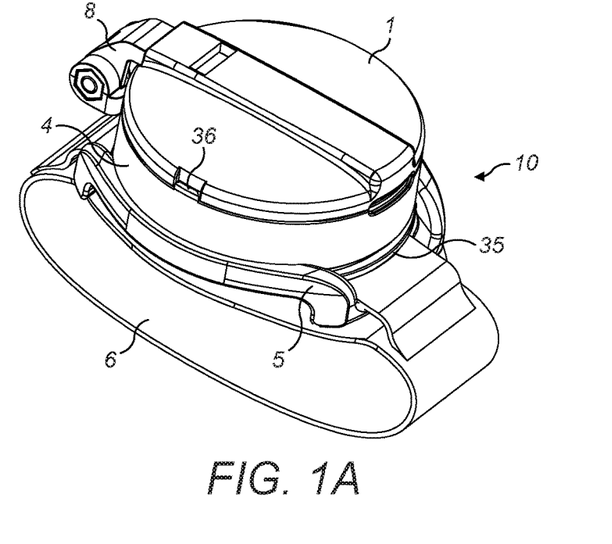
FIGS. 1A, 1B and 1C depict perspective views of a mirror assembly of the present invention in open and closed states.
Figure 1B:
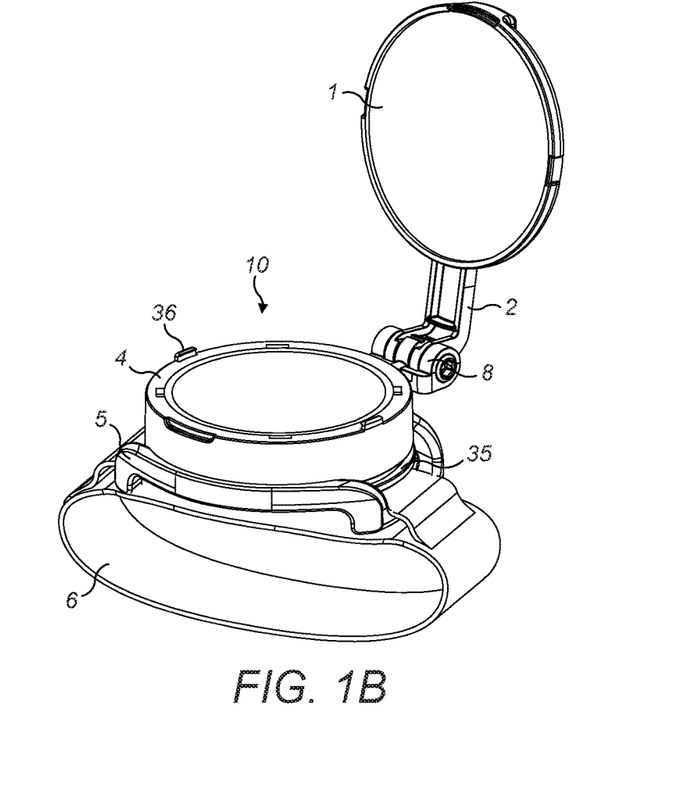
Figure 1C:
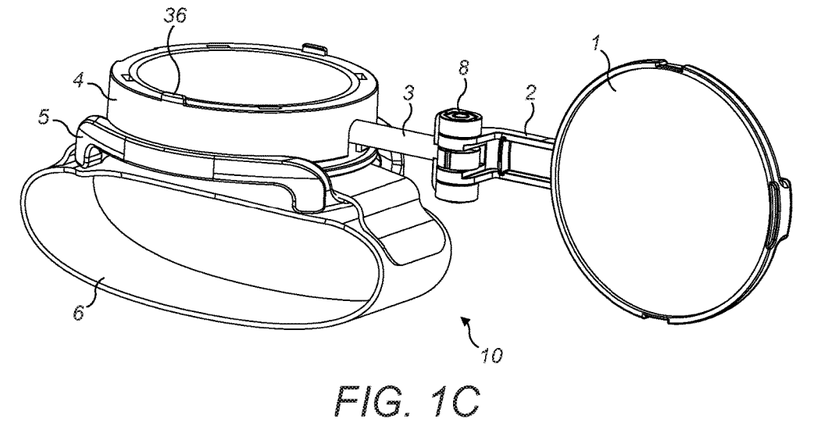

FIGS. 1A, 1B and 1C show a mirror assembly 10 according to the present invention wearable by a user, such as a cyclist. FIG. 1A shows the assembly in a closed state and FIGS. 1B and 1C show the assembly in an open state with a mirror unit 1 opened up away from base unit 4.

The mirror assembly is, in this regard, directed to sporting or recreational activities where being able to see behind you without having to turn your head around is desired. This of course does not mean the mirror assembly could not be used in other activities, such those of a business or commercial nature.

The base unit 4 has a user fastening 6 for releasably fastening the base unit 4 to a user (for example to his wrist or arm). The mirror unit 1 is connected to the base unit 4 by an arm member 2, 3 that can be deployed to move the mirror unit 1 away from the base unit 4. The mirror unit includes a mirror for enabling a user, such as a cyclist, to have a rear view whilst on the move. The mirror can be a flat mirror or an arcuate mirror such as a convex or a concave mirror.

The user fastening 6 consists of a body 5 and means such as a strap 6 connected to the body 5 for fastening the body 5 to a user's limb, such as a wrist. The mirror assembly could also be fastened around an upper arm or a forearm as appropriate.

In this embodiment, the base unit 4 of the mirror assembly is itself rotatably mounted with respect to the body 5 and user fastening. Various means can be used for rotatably mounting the base unit 4 to the body and user fastening. This may include a ratchet mechanism or friction joint allowing the base unit to be set to different rotational orientations in relation to the user fastening. For example, as shown in FIG. 1 the outer wall of the base unit 4 may have annular slot or groove 35 which inter-engages with inwardly facing protrusions or detents in the body 5.

The general profile of the body and the base unit mounted thereto are shown as circular as illustrated in FIGS. 1A, 1B and 1C but other shapes could of course be considered.

Small catch members 36 are provided in the top of the base unit latching the mirror unit 1 in place when not deployed.

The mirror unit 1 of this embodiment is rotatable around a longitudinal axis of the arm member 2, 3. More specifically, and referring to FIG. 1, the arm consists of a first limb 3 attached to the base unit and a second limb 2 distinct from the first limb 3 coupled to the mirror unit 1. The second limb is hinged to the first limb by way of hinge 8 to enable the rotation of the second limb with respect to the first limb 3 in a folding motion. In this configuration, the mirror unit 1, which is mounted on the second limb 2, is therefore foldable with respect to the first limb 3.

Figure 2:
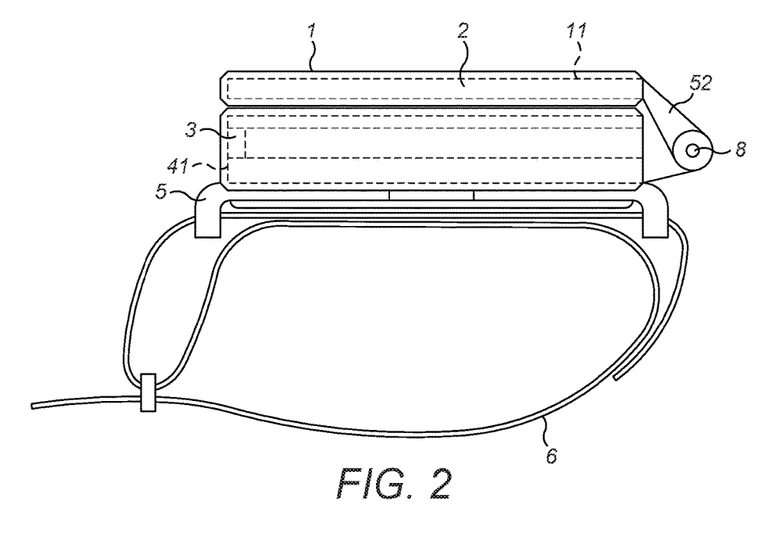
FIG. 2 depicts a side view of the mirror assembly of FIG. 1 in the closed state.
Figure 3:
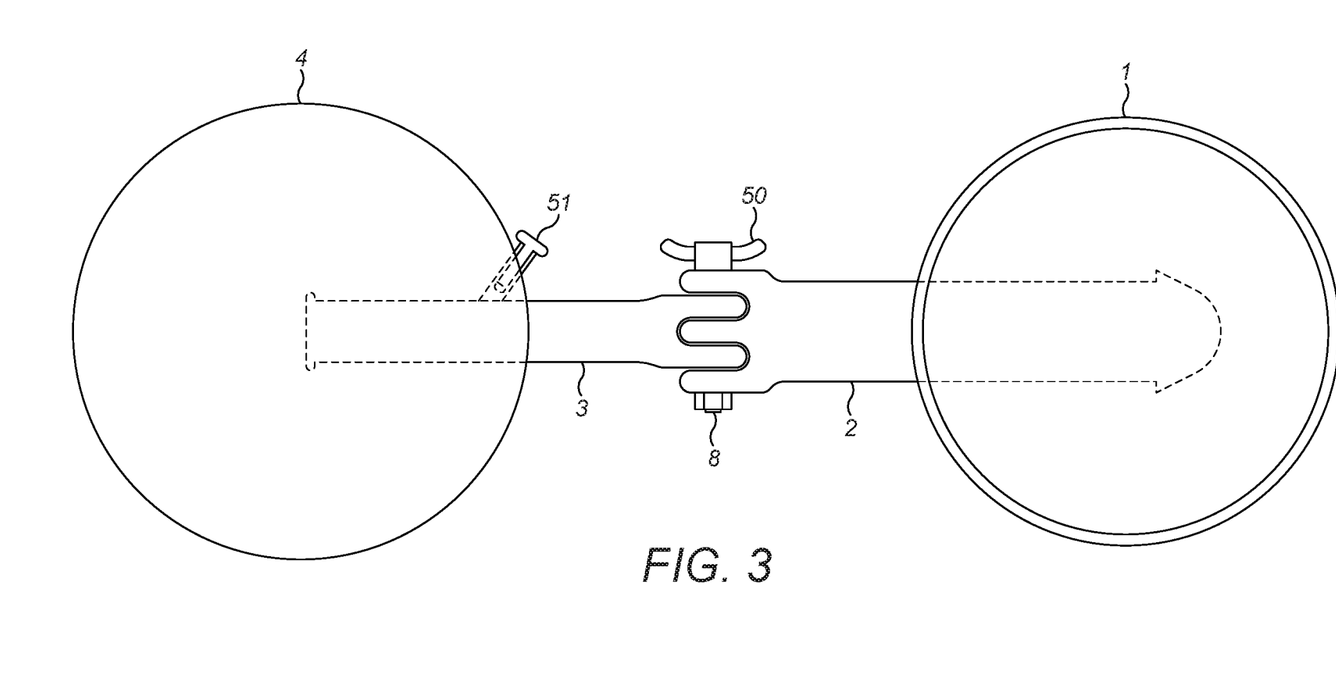
FIG. 3 depicts a plan view from above of the mirror assembly of the present invention in an open state.

As shown in FIG. 3, the first limb 3 is retractable into the base unit 4. FIG. 2 displays the mirror assembly 10 in a closed state, where the mirror unit and the base unit are in a closed relationship or state. In the closed state, the first limb 3 is retracted into a cavity 41 of the base unit 4.

The retractable feature offers the advantage that the arm can be extended to move the mirror unit away from the base unit and the arm can be retracted to move the mirror unit 1 towards the base unit to the closed state, enhancing the compactness of the assembly, for when it is not in use.

Figure 4:
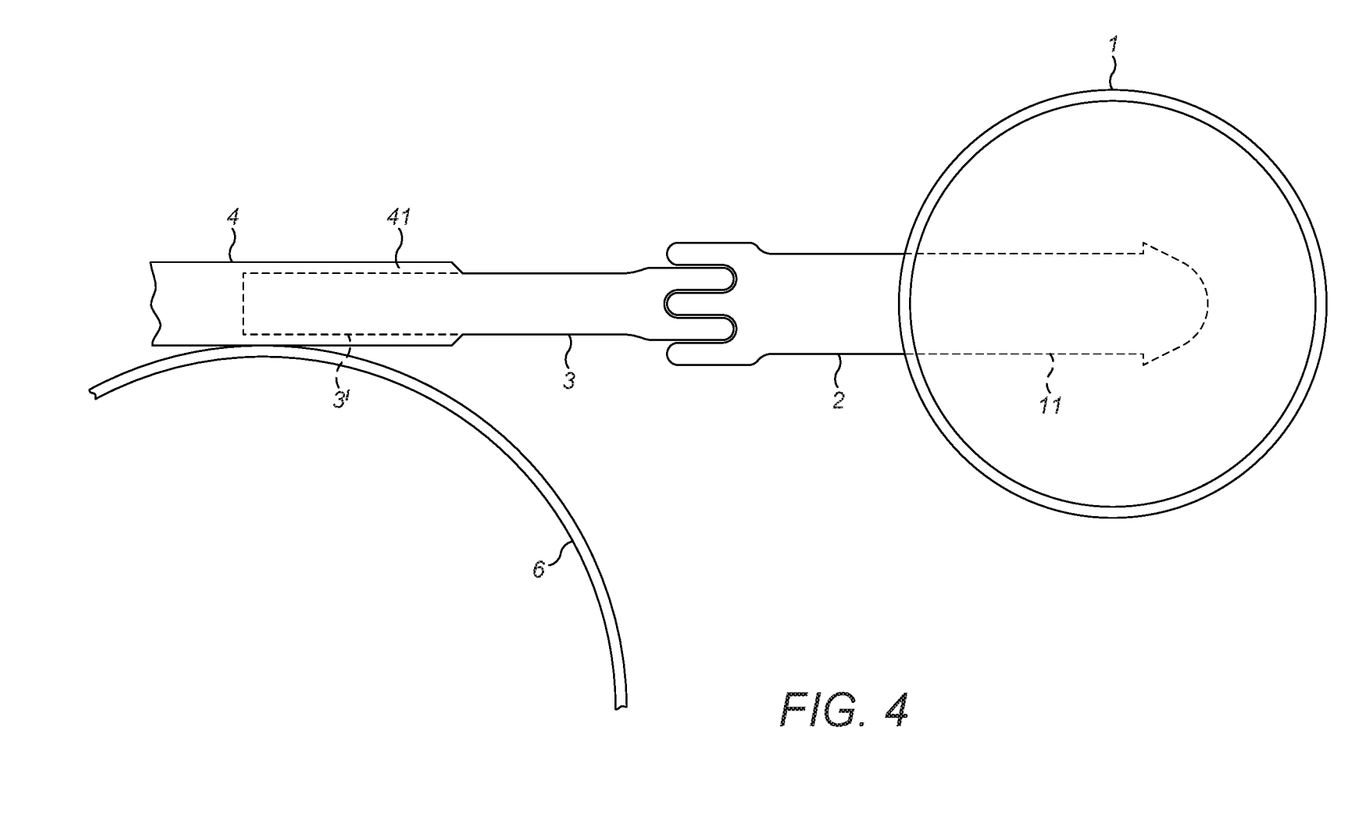
FIG. 4 depicts a side view of the mirror assembly of the present invention in an open state.

The arm 3, 2 extends generally radially outwardly from the base unit 4 as shown in FIGS. 3 and 4. Whilst not shown, in an alternative embodiment the arm 3, 2 may extend outwardly at an angle relative to the plane of the base unit 4.

When the arm is extended, the mirror unit is positioned away from the base unit. Therefore a user such as a cyclist, who wears the device in the open state will have the mirror unit away from his body, and this enables him to have enhanced rear visibility. This feature is particularly useful for cyclists because it enables them to have a view of the traffic behind them without turning their head around. Hence the extendable mirror assembly provides a safety feature to cyclists who can concentrate on the road ahead and take appropriate decisions based on the traffic behind them.

In this connection, FIGS. 3 and 4 show the open state where the arm is extended, and where in particular limb 3 is extended. In the open state, the limb 3 is extended outside the base unit 4. However, as shown in FIG. 4, an end portion 3' of the limb 3 remains inside the base unit for maintaining a stable connection of the base unit to the limb 3. In FIG. 4 the second limb 2 is shown only partially extended.

As shown in FIG. 2, the second limb 2 is retractable into the mirror unit 1. In this regard, the second limb 2, in dashed line, retracts inside a cavity of the mirror unit 1 when the mirror assembly is in a closed state.

As described above, the first limb 3 and the second limb 2 are hingedly coupled by means of the hinge 8. One or more hinges of various types could be used, but in the example the hinge either includes a friction joint or a means for locking it in position, such as a butterfly nut and bolt 50 as shown by way of example in FIG. 3.

The hinge 8 enables articulated movement of the second limb 2 with respect to the first limb 3. The first and second limbs 3, 2 are slideably receivable into respective cavities 41, 11 of the base unit 4 and the mirror unit 1. As indicated above, the first limb 3 can retract inside the base unit 4 by a sliding movement. The sliding movement of the limb 3 along a receiving cavity of the base unit 4 can be enabled for example by the presence of a rail system on inner sides of the base unit 4 or a profiled opening into the base unit (not shown).

As shown in FIG. 2, when the first limb 3 is retracted inside the base unit 4, the end of the first limb 3 which includes hinge 8 remains outside the cavity of base unit 4. The length of the first limb 3 corresponds substantially to the size of the cavity 41 so that when retracted, the first limb 3 fits inside the cavity of the base unit. In other possible configurations, the first limb 3 may be longer than the receiving cavity of the base unit 4. In the latter case, when retracted, a significant portion of the first limb may still extend outside the base unit 4.

In the preferred embodiment, the first limb 3 is rotatably mounted with respect to the base unit 4 so that the mirror unit can be rotated relative to the base unit by way of rotating first limb 3 within body 4. The first limb may have a friction or interference fit with a surface of the cavity 41 to ensure the desired rotational orientation is maintained. Alternatively, a locking mechanism may be employed such as a grub screw 51 that can be tightened against the first limb as shown in FIG. 3 or a rotational locking mechanism may be used.

Referring to FIG. 4, the mirror unit 1 has been set substantially perpendicular to the plane of the base unit and the first limb 3. This is achieved by way of rotating the first limb 3 within the body 4. The plane of the mirror unit 1 can be returned to being parallel with the plane of the base unit by rotation of the first limb 3. Thereafter, the mirror unit can be moved to a closed state by rotating the second limb 2 towards the base unit in a folding fashion about hinge 8.

The mirror unit may house a flat or a spherical mirror. The mirror unit preferably comprises a substantially plane recess that can securely receive a mirror. Various kinds of mirrors could be fitted inside a mirror unit including flat, convex or concave mirrors.

The folding rotation of the second limb 2 with respect to the first limb 3 causes the mirror unit to be folded onto the base unit. In the closed state, the second limb 2 substantially overlies the first limb 3 as seen in FIG. 2.

As seen in FIG. 3, the base unit 5 and the mirror 1 have circular shapes and substantially identical outer dimensions. As such, when the mirror units folds onto the base unit (see FIG. 2) the respective centres of the mirror unit and the base unit align along an axis perpendicular to the base unit. This makes for a compact device that a user can readily stow away in their pocket when not in use.

Figure 5A:
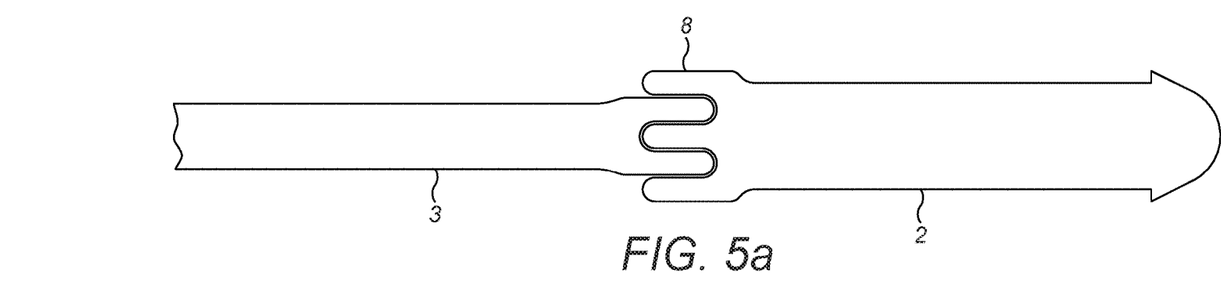
FIG. 5 depicts side views of the mirror assembly of the present invention with limbs deployed in the open state (FIG. 5b) and the closed state (FIG. 5c)
Figure 5B:
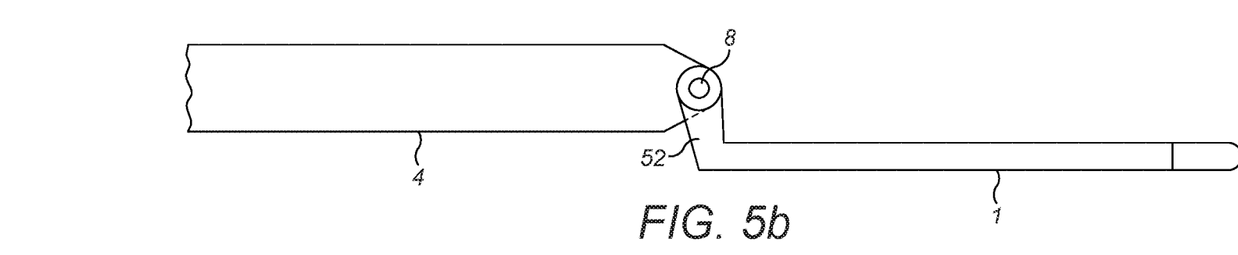
Figure 5C:
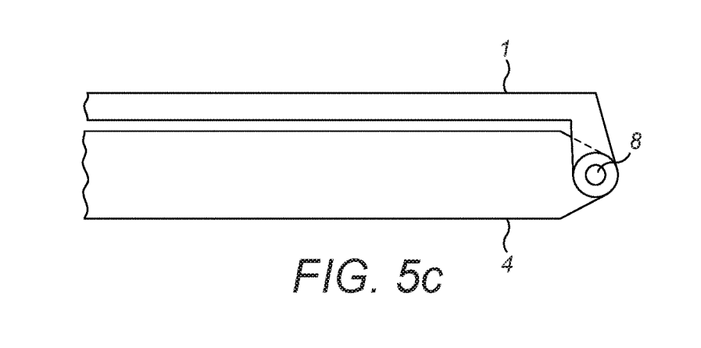

The second limb has an angled section 52 adjacent hinge 8 that allows the mirror unit 1 to seat neatly against the base unit 4. This angled section is best seen on FIG. 2, and 5c.

The body 5 of the user fastening may comprise a plate-like member, upon which the base unit 4 can rotate. As shown in FIGS. 1, 2, the strap 6 of the user fastening may be attached to or may be integral with the plate 5. In one variant, a friction plate may be provided underneath the strap 6 that can contact the body of the user when the mirror assembly is worn around the user's wrist. This friction plate can subsequently enable rotation of the base unit 4 with respect to the plate 5 and the strap 6. Alternatively, as discussed in relation to FIGS. 1A, 1B and 1C, the base unit may have an annular groove 35 on its outer periphery which inter-engages with inwardly facing protrusions or detents in the body wall.

Figure 6:
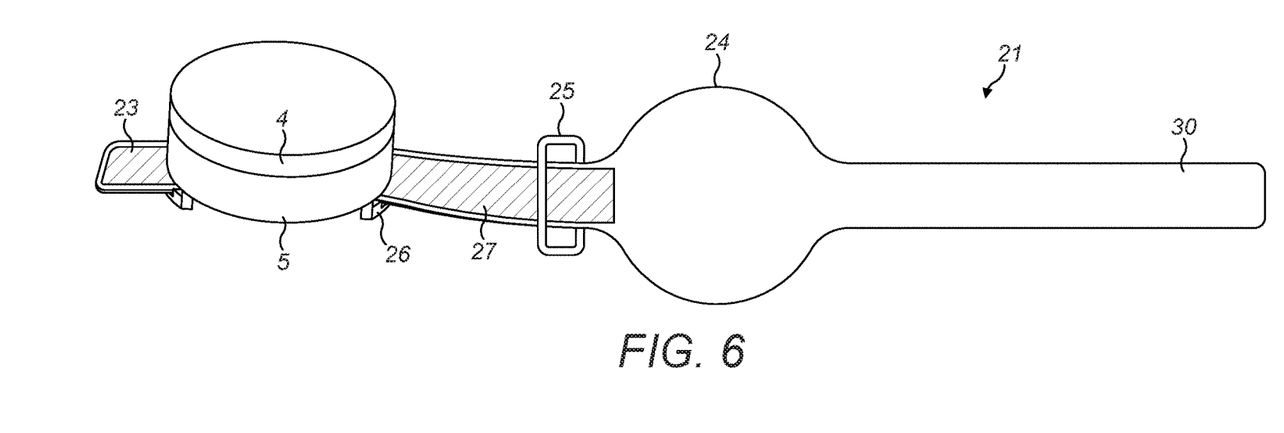
FIG. 6 shows a top view of a strap for use with the present invention.
Figure 7:
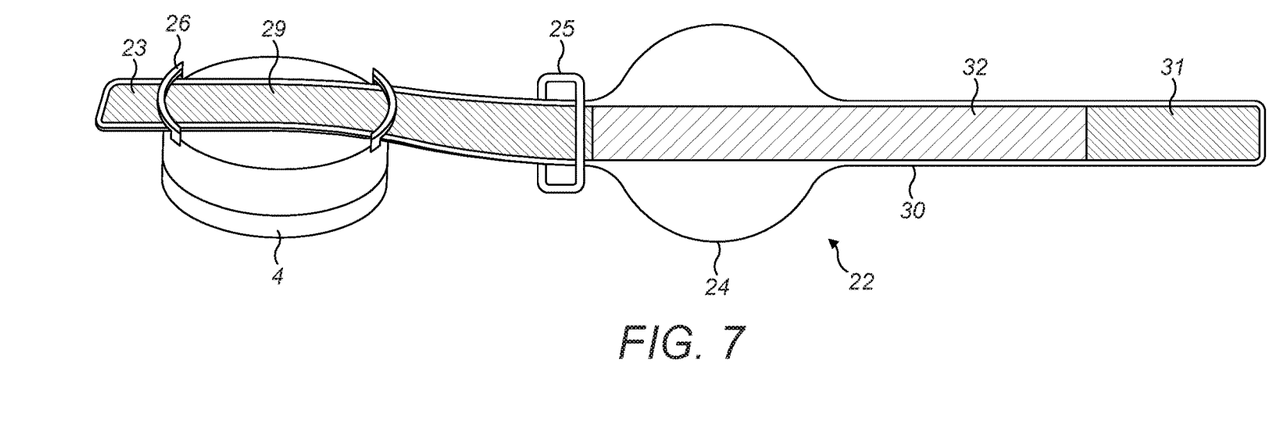
FIG. 7 shows and underside view of a strap for use with the present invention.
Figure 8:
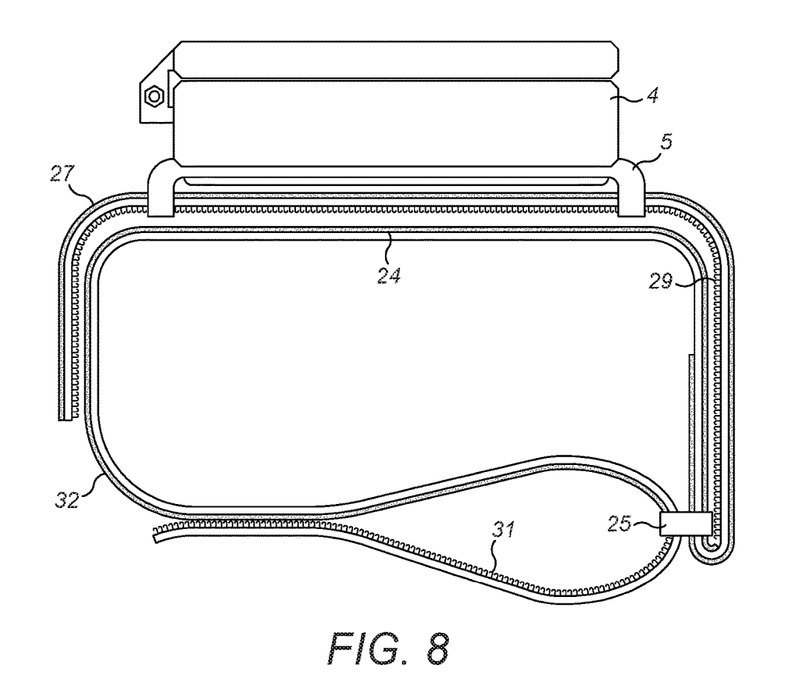
FIG. 8 shows a view of the strap ready for application.

FIGS. 6, 7 and 8 show further views of a further embodiment of an adjustable strap 20 for use with the present invention. FIG. 6 shows a plan view of a top surface 21 of the strap 20 whilst FIG. 7 shows an underside surface 22 of the strap. FIG. 8 shows the strap as folded when ready for use.

The strap has areas of hook and loop fastening material on the both surfaces. On the top surface shown in FIG. 6, loop fastening material 27 is provided along the one arm 23 of the strap up to a central area 24. The central area 24 is enlarged and intended to be located under the base unit in use to cushion the user from the base unit as shown in FIG. 8. A free loop 25 is provided along the section of arm 23, between the central area 24 and where the strap is threaded through slots 26 in base unit 4. The other arm 30 is free from hook and loop fastening material as this will be the predominant area of material in contact with the user's wrist.

FIG. 7 shows that the underside of the strap 20 is provided with an area of hook fastening material 29 on the arm 23, and an area of loop fastening material 32 across the central area 24 and extending along the other arm 30. A further area of hook fastening material 31 is provided towards the end of arm 30.

In order to apply the strap the arm 23 is threaded through slots 26 in the base unit 4 as shown best in FIG. 7. Then the strap is folded over in arm 23 so that the central area 24 is positioned under the base unit 4. It will be appreciated that the base unit can be moved along arm 23 thereby dictating how close it is to the central area 24. In other words, moving the base unit 4 closer to the central area 24 will mean that the fold axis of arm 23 will be closer to the central area. This will have an effect in shortening the overall length of the strap 20. It will therefore be appreciated that the strap length can be adjusted to suit the user.

The area of loop fastening material 32 running across the central area 24 will engage with the hook fastening material 29 provided on arm 23 to hold the base unit 4 above the central area 24. The free loop 25 can be moved to the fold in arm 23 created by folding over arm 23 in this way.

Then in order to apply the strap to a user, the free end of arm 30 is passed through free loop 25 and back to engage with the loop fastening material 27 and 32. It will be appreciated that the fastening of arm 23 onto arm 30 creates an overlapping area, but where the loop fastening material is continuous as the end of arm 23 finishes and the loop fastening material on arm 30 continues.

With this arrangement the strap can be readily adjusted for the user, whilst still maintaining a cushioned section where the central area 24 is positioned directly beneath the base unit, regardless of the adjustment.

The strap can be used with the mirror assembly of the present invention, but may be applied equally to other straps where a similar adjustment is desirable, such as watch straps.

It will further be appreciated that the areas of hook and loop fastening material may be reversed. Furthermore, other types of reusable fastening materials may be employed.

The invention claimed is:

1. A mirror assembly for use by an individual, the mirror assembly comprising:—a base unit having a fastening and an exterior profile; and a mirror unit that matches the exterior profile of the base unit and which is connected to the base unit by an arm member, the arm member being deployable to move the mirror unit away from the base unit, wherein the arm member is formed of first and second limbs, hingedly coupled together, wherein the first limb has a longitudinal axis and is axially retractable into the base unit along said longitudinal axis.

2. A mirror assembly according to claim 1, wherein the second limb is retractable into the mirror unit.

3. A mirror assembly according to claim 1, wherein the base unit is rotatably mounted with respect to the fastening.

4. A mirror assembly according to claim 1, wherein the mirror unit is rotatable about the axes of at least one of the first and second limbs.

5. A mirror assembly according to claim 1, wherein said base has a cavity for receiving said first limb and said mirror unit has a cavity for receiving said second limb, and wherein the first and second limbs are slideably receivable into their respective cavities of the base unit and the mirror unit.

6. A mirror assembly according to claim 1, wherein the first limb is rotatably mounted with respect to the base unit.

7. A mirror assembly according to claim 1, wherein the second limb is profiled to resist rotation with respect to the mirror unit.

8. A mirror assembly according to claim 1, wherein the mirror unit houses a flat or a spherical mirror.

9. A mirror assembly according to claim 1, wherein said base has a cavity for receiving said first limb and said mirror has a cavity for receiving said second limb, the mirror assembly is deployable between open and closed states, whereby in the open state, at least one of the first and second limbs extends out of its respective cavity, and in the closed state the first and second limbs are retracted within their respective cavities and the second limb is rotated about its hinge with the first limb so that the mirror unit folds onto the base unit.

10. A mirror assembly according to claim 9, wherein the base unit has a circular shape and the mirror unit has a circular shape, and wherein the respective centres of the base unit and the mirror unit can align when the mirror unit folds onto the base unit.

11. A mirror assembly according to claim 1, wherein the second limb has an angled section adjacent the hinge to allow a lower face of the mirror unit to seat against an upper face of the base unit.

12. A mirror assembly according to claim 1, wherein the fastening comprises a strap.

13. A mirror assembly according to claim 12, wherein the strap comprises a central area having first and second arms extending therefrom; a top surface of the strap having a section of first fastening material extending along said first arm substantially from the central area to its end, the first arm being provided with a free loop; an underside surface having a section of second fastening material extending along said first arm, the second fastening material being configured for releasably mating with the first fastening material; the underside surface further being provided with a section of said first fastening material extending across said central area and along said second arm, and a section of second fastening material at an end portion of the second arm.

14. A mirror assembly according to claim 13, wherein the central area comprises an enlarged cushioned area.

15. A mirror assembly according to claim 13, wherein the free loop is free to move along the first arm.

16. A mirror assembly according to claim 13, wherein the first and second fastening materials are of a hook and loop variety.

17. A mirror assembly according to claim 13, wherein the strap is substantially planar.

* * * * *